US010174651B2

(12) United States Patent
Müller

(10) Patent No.: US 10,174,651 B2
(45) Date of Patent: Jan. 8, 2019

(54) CONTROLLABLE OIL SEPARATION DEVICE

(71) Applicant: ThyssenKrupp Presta TecCenter AG, Eschen (LI)

(72) Inventor: Ulf Müller, Chemnitz (DE)

(73) Assignee: THYSSENKRUPP PRESTA TECCENTER AG, Eschen (LI)

( * ) Notice: Subject to any disclaimer, the term of this patent is extended or adjusted under 35 U.S.C. 154(b) by 0 days.

(21) Appl. No.: 15/031,832

(22) PCT Filed: Oct. 23, 2014

(86) PCT No.: PCT/EP2014/002865
§ 371 (c)(1),
(2) Date: Apr. 25, 2016

(87) PCT Pub. No.: WO2015/062711
PCT Pub. Date: May 7, 2015

(65) Prior Publication Data
US 2016/0265403 A1 Sep. 15, 2016

(30) Foreign Application Priority Data

Oct. 30, 2013 (DE) .................. 10 2013 111 955

(51) Int. Cl.
F01M 13/04 (2006.01)
F01M 13/00 (2006.01)
(Continued)

(52) U.S. Cl.
CPC ............. F01M 13/04 (2013.01); B01D 45/08 (2013.01); F01M 13/00 (2013.01);
(Continued)

(58) Field of Classification Search
CPC ........... F01M 13/04; F01M 2013/0433; F01M 13/028; F01M 2013/0016; F01M 2013/0072; F01M 2013/0422; F01M 13/02
See application file for complete search history.

(56) References Cited

U.S. PATENT DOCUMENTS 5,335,641 A * 8/1994 Schnabel ............... F01M 11/04
123/572
8,042,529 B2 * 10/2011 Meinig .................. B01D 45/08
123/572
(Continued)

FOREIGN PATENT DOCUMENTS

CN 201148890 Y 11/2008
DE 10205981 A1 8/2003
(Continued)

OTHER PUBLICATIONS

Int'l Search Report for PCT/EP2014/002865 dated Jan. 15, 2015 (dated Jan. 23, 2015).
(Continued)

Primary Examiner — Long T Tran
(74) Attorney, Agent, or Firm — thyssenkrupp North America, Inc.

(57) ABSTRACT

An oil separation device for separating oil from a gas stream for ventilating a crankcase of a combustion engine may include an inflow side and an outflow side. The inflow side can be fluidically connected to the crankcase of the combustion engine and may receive the gas stream laden with oil. The outflow side can be fluidically connected to an intake tract of the combustion engine and may receive the gas stream substantially purged of oil. The device may include a first control member for varying a first flow cross section of the gas stream and controlled by a gas pressure in the crankcase. The device may have a second control
(Continued)

member for varying a second flow cross section of the gas stream positioned downstream of the first flow cross section, wherein the second control member is controlled by a vacuum in the intake tract of the combustion engine.

15 Claims, 4 Drawing Sheets

(51) Int. Cl.
*F01M 13/02* (2006.01)
*B01D 45/08* (2006.01)

(52) U.S. Cl.
CPC ........ *F01M 13/022* (2013.01); *F01M 13/023* (2013.01); *F01M 2013/0005* (2013.01); *F01M 2013/0044* (2013.01); *F01M 2013/0433* (2013.01)

(56) References Cited

U.S. PATENT DOCUMENTS

| | | | | |
|---|---|---|---|---|
| 8,388,713 | B2* | 3/2013 | Enderich | B01D 45/04 55/313 |
| 2008/0155949 | A1* | 7/2008 | Dunsch | B01D 45/08 55/456 |
| 2009/0199826 | A1* | 8/2009 | Meinig | B01D 45/08 123/573 |
| 2010/0107883 | A1 | 5/2010 | Faber | |
| 2011/0036242 | A1* | 2/2011 | Enderich | B01D 45/04 96/400 |
| 2014/0165977 | A1* | 6/2014 | Copley | B01D 45/08 123/573 |

FOREIGN PATENT DOCUMENTS

| | | |
|---|---|---|
| DE | 102004006082 A1 | 8/2005 |
| DE | 102008028543 B3 | 10/2009 |
| EP | 0566826 A1 | 10/1993 |
| EP | 2609979 A1 | 7/2013 |
| GB | 1263503 A | 2/1972 |
| WO | 2004105955 A1 | 12/2004 |
| WO | 2011143464 A2 | 11/2011 |

OTHER PUBLICATIONS

German Priority Search Results dated Jul. 25, 2014.
Office Action issued in counterpart Chinese application No. 201480057274.2 dated Aug. 30, 2017.
English abstract of CN201148890Y.

* cited by examiner

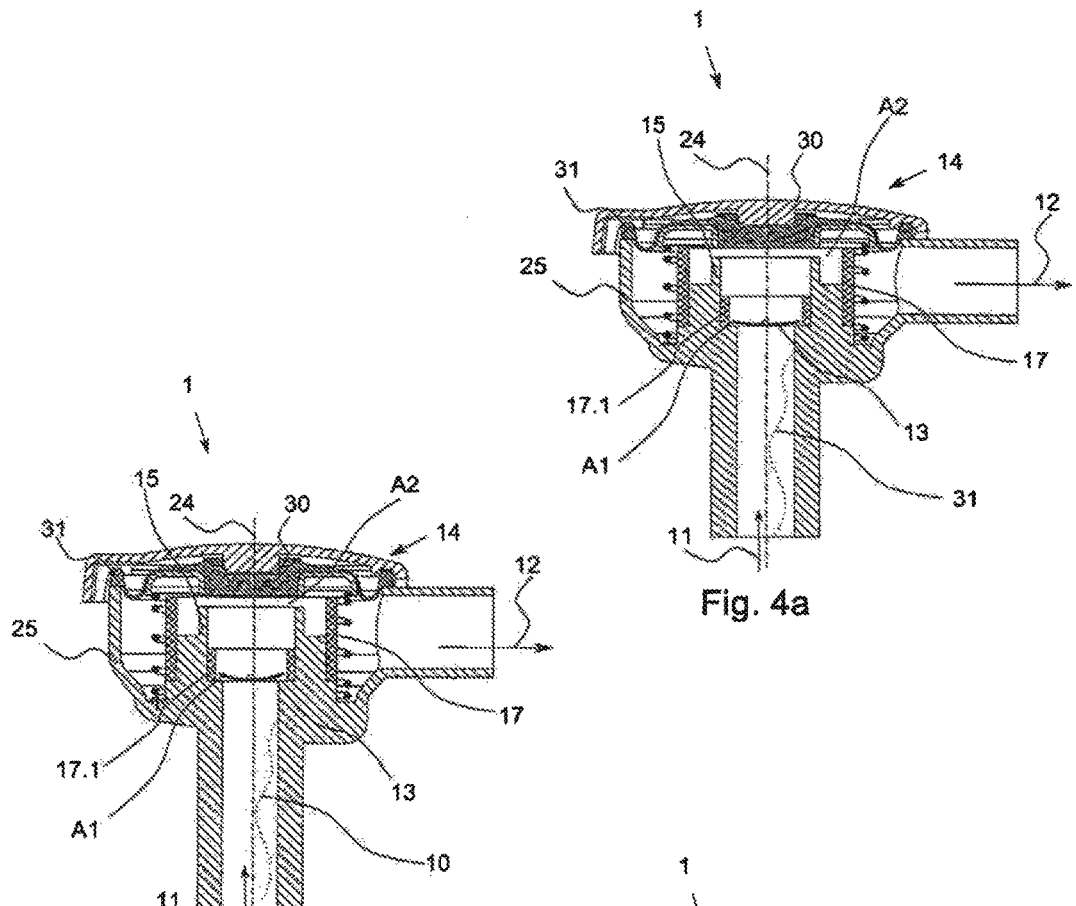
Fig. 4a
Fig. 4b
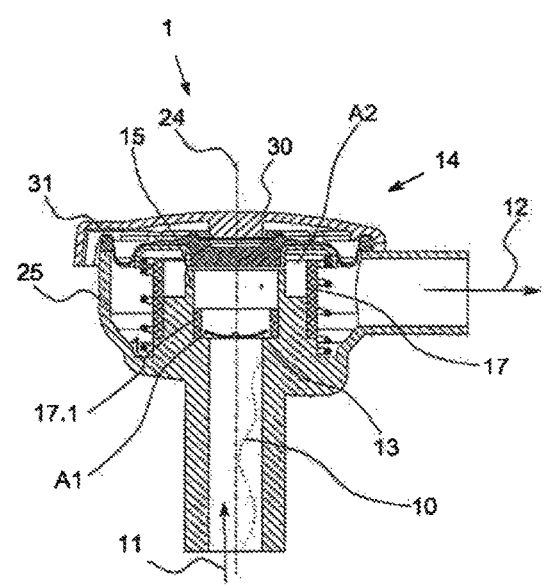
Fig. 4c

CONTROLLABLE OIL SEPARATION DEVICE

CROSS REFERENCE TO RELATED APPLICATIONS

This application is a U.S. National Stage Entry of International Patent Application Serial Number PCT/EP2014/002865, filed Oct. 23, 2014, which claims priority to German Patent Application No. DE 102013111955.7 filed Oct. 30, 2013, the entire contents all of which are incorporated herein by reference.

FIELD

The present disclosure relates to oil separation and, more particularly, to oil separation devices for separating oil from a gas stream for ventilating a crankcase of a combustion engine.

BACKGROUND

In the case of non-switchable oil separation devices for separating oil from a gas stream for ventilating a crankcase of a combustion engine, referred to as the "blow-by gas stream", the flow geometry relevant to oil separation is generally invariable over the applied volume flow of blow-by gas. As a result, the oil separation device acts relatively poorly at low volume flows as regards the achievable separation performance, while, at high volume flows of the blow-by gas, the oil separation device does act more effectively but the pressure loss in the oil separation device rises as the square of the volume flow owing to the fixed geometry of the flow path through which the gas stream flows.

In "switchable" oil separation devices, a larger flow cross section for the flow of the gas stream is made available by means of a, generally spring-loaded, element as the volume flow of blow-by gas increases. As a result, separation efficiency is kept relatively constant over a wider range of blow-by gas volume flow. However, the pressure loss across the entire system increases.

At engine load points at which there is a high vacuum in the intake tract, particularly in the case of turbocharged engines, a pressure control valve situated downstream of the oil separation device is used to limit the minimum vacuum in the crankcase of the combustion engine. For example, the vacuum prevailing ahead of the turbocharger of a combustion engine can be up to 60 mbar and that in the intake manifold can be up to 300 mbar. By means of the pressure control valve, the vacuum can be limited to between 30 mbar and 50 mbar, for example. This pressure control is accomplished by increasing the flow resistance across the pressure control valve, resulting in a further reduction in the flow cross section, although this is not accompanied by an improvement in separation performance. As a result, the available flow energy is not used for separation since the gas stream flowing through the pressure control valve has generally already been purged.

DE 10 2004 006 082 A1, for example, shows a cyclone-type oil separation device, in which a plurality of cyclones are arranged in parallel. Depending on the pressure difference, caused by a first cyclone, between the oil-laden gas stream supplied and the purged gas stream, flap valves open the flow path through additional, subsequent cyclones. However, the energy potential which could be obtained for further increasing separation performance remains unused here.

DE 102 05 981 A1 shows another oil separation device, which is constructed with switchable cyclones, and a slide, by means of which openings of the cyclones can be opened or closed, is provided. For this purpose, various apertures are provided in the slide, each being of a different size. If the slide is moved further in an opening direction by a larger quantity of gas volume flow, the inflow openings of the individual cyclones open in such a way that the flow cross sections into the cyclones increase. If the volume flow of the oil-laden gas falls again, the individual flow cross sections of the cyclones close again, but, even with this system, there is no success in enabling the flow energy used for throttling to be used to improve separation performance.

BRIEF DESCRIPTION OF THE FIGURES

FIG. 4a is a cross-sectional view of an example oil separation device with two separating bodies, the oil separation device being in a first state.

FIG. 4b is a cross-sectional view of an example oil separation device with two separating bodies, the oil separation device being in a second state.

FIG. 4c is a cross-sectional view of an example oil separation device with two separating bodies, the oil separation device being in a third state.

DETAILED DESCRIPTION

Figure 1:
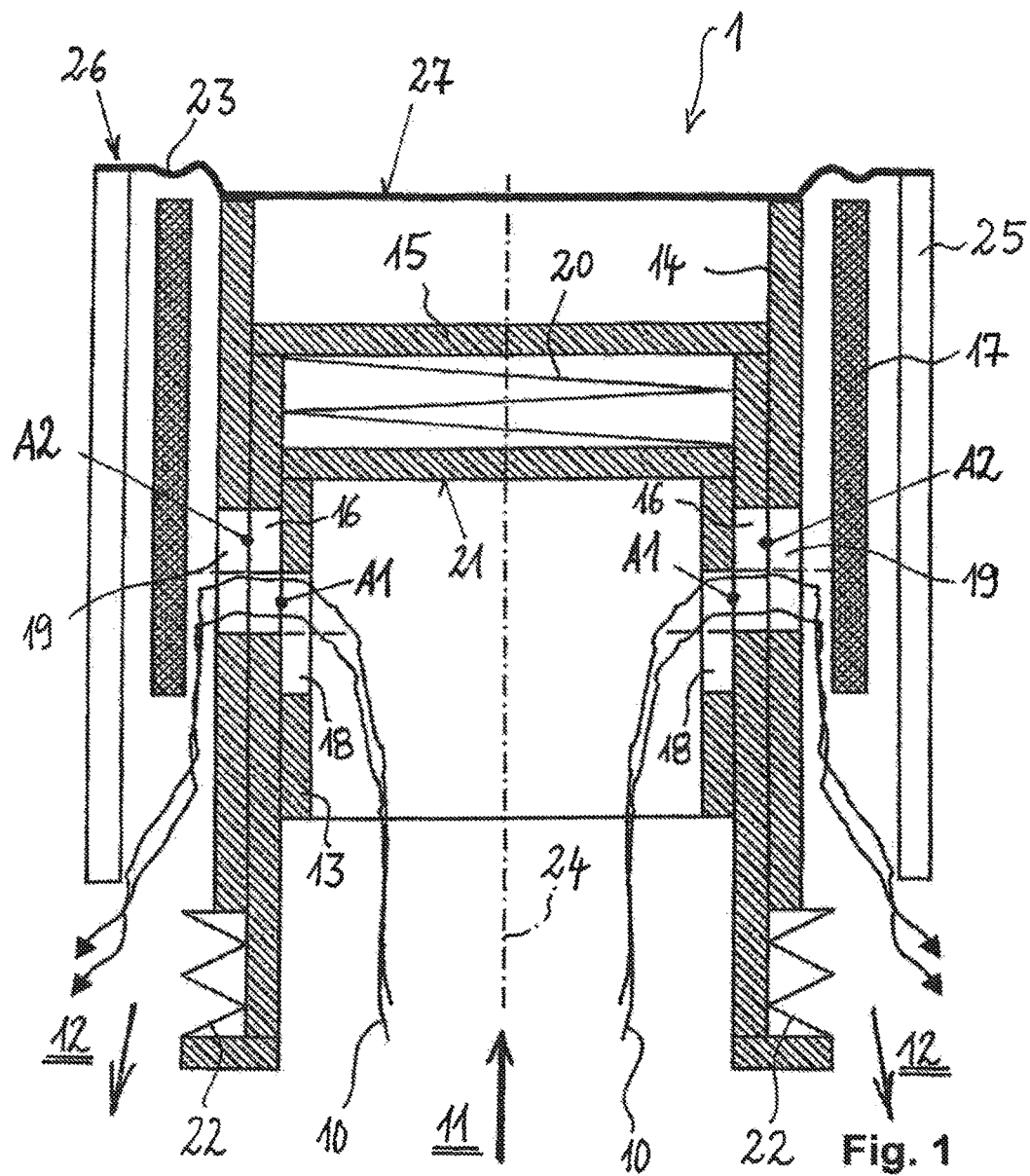
FIG. 1 is a cross-sectional view of an example oil separation device for separating oil from a gas stream for ventilating a crankcase of a combustion engine, wherein the combustion engine is in an operating state with a low torque and a low speed.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

The present disclosure generally concerns oil separation devices for separating oil from a gas stream for ventilating a crankcase of a combustion engine. In some examples, the device may include an inflow side, which may be in fluid connection with the crankcase of the combustion engine and from which the gas stream laden with oil can flow to the oil separation device. The device may also include an outflow side, which may be in fluid connection with an intake tract of the combustion engine and into which the gas stream substantially purged of oil can flow from the oil separation device.

One example object of the present disclosure is to develop an oil separation device for separating oil from a gas stream for ventilating a crankcase of a combustion engine, by means of which it is possible to overcome the disadvantages of the prior art, one example intention being to provide an oil separation device which allows control of the pressure in the crankcase and which, in accordance with the speed and load point of the combustion engine, has an optimum effective separation cross section over a wide operating range.

In some examples, a first control member may be provided, by means of which a first flow cross section of the gas stream passing through the oil separation device can be varied and which can be controlled by a gas pressure in the crankcase. Moreover, a second control member may also be provided, by means of which a second flow cross section—situated downstream of the first flow cross section—of the gas stream passing through the oil separation device can be varied and which can be controlled by means of a vacuum in the intake tract.

With the oil separation device according to the invention, there is the possibility of controlling the flow cross section in the oil separation device for passing through the oil-laden gas stream, on the one hand in accordance with the gas pressure in the crankcase and on the other hand in accordance with the vacuum in the intake tract. Thus, the goal is achieved of improving separation performance by also exploiting the energy potential for control of the gas pressure in the crankcase, and the energy potential is exploited in an optimum manner substantially at every operating point of the combustion engine. As a result, it is thereby possible to improve the efficiency of the oil separation device.

Because of separate control of a first flow cross section of the gas stream passing through the oil separation device by means of the gas pressure in the crankcase and of a second flow cross section of the gas stream passing through the oil separation device by means of the vacuum in the intake tract, oil separation can take place in a load-dependent manner while the speed of the combustion engine remains constant and, in the same way, oil separation can take place in a speed-dependent manner while the load of the combustion engine remains constant, and the separation-relevant flow cross sections in the oil separation device can be set in an optimized way at each operating point of the combustion engine, such that maximum separation performance can be achieved.

At load points with a high load and a high speed, there is a high vacuum in the intake tract of the combustion engine, e.g. when the turbocharger is operating at full capacity, and optimized oil separation is achieved by reducing the separation-relevant flow cross sections by virtue of the increased vacuum in the intake tract. As a result, the flow velocity through the separation-relevant flow cross sections increases and separation performance is improved. At the same time, the flow resistance across the separation system increases owing to the narrower cross sections, similarly to the operation of known pressure control valves but simultaneously using the flow energy for the oil separation function.

To form the oil separation device, a main body can be provided, into which flow openings for passing through the gas stream are introduced. Moreover, a separating body can be provided and arranged in such a way that the gas stream which has passed through the flow openings can flow against it. A high level of oil separation from the gas stream is achieved especially if the gas stream flows through a constriction in the cross section of the flow openings and the gas stream is accelerated as it passes through the flow openings. During this process, the accelerated gas stream with the entrained oil, e.g. in droplet form, impinges upon the separating body, as a result of which ultimately the oil is separated from the gas stream. By virtue of the separate control of the first and second flow cross sections in accordance with the gas pressure in the crankcase and, independently thereof, with the vacuum in the intake tract, the gas flow can undergo high acceleration against the separating body at a multiplicity of operating points of the combustion engine involving different torques and different speeds, a constriction in the cross section in the flow path of the oil separation device. The separating body can be composed of a nonwoven material or similar, for example.

The first control member can be arranged adjoining the main body and can have control openings, through which the gas stream can be passed. In this case, the first control member can be moved relative to the main body, such that the overlap between the control openings and the flow openings in the main body can be varied in order to change the first flow cross section.

The second control member can be arranged opposite the first control member and likewise adjoining the main body, e.g. on an opposite side of a wall of the main body into which the flow openings are introduced. The second control member can likewise have control openings, through which the gas stream can be passed, e.g. after being passed through the control openings in the first control member. In this case, the second control member can likewise be embodied so as to be movable relative to the main body, allowing the overlap between the control openings and the flow openings in the main body to be varied in order to change the second flow cross section. By means of the separate mobility of the first and second control member, in each case adjoining the main body, the first and second flow cross sections can likewise be varied independently of one another.

Thus, at least part of the flow path of the gas stream through the oil separation device is formed by the control openings in the first control member, by the flow openings in the main body and by the adjoining further control openings in the second control member, which adjoin the flow openings in the main body. Due to the partial overlap between the control openings and the flow openings in the main body, a system of double slides is formed, and it is possible for the control openings in the control members to fully overlap the flow openings in the main body only at a load point at which a large flow cross section is required, said load point being associated with a high torque and a low speed, in order to form a large flow cross section owing to the large volume flow in the case of a high torque and a low vacuum in the intake tract of the combustion engine owing to the low speed. The large flow cross section is required since there is only a small suction effect due to the vacuum in the intake tract.

A high power of the combustion engine at low speeds is characterized by the fact that a high torque is supplied, and a high torque produces increased formation of blow-by gases.

According to an advantageous development of the oil separation device according to the invention, a first spring element can be provided, by means of which the first control member is preloaded, wherein the first control member has an effective surface, which can be subjected to the gas pressure in the crankcase, wherein a force counter to the preloading force of the first spring element can be produced by means of a gas pressure on the effective surface. Moreover, a second spring element can be provided, by means of which the second control member is preloaded, wherein the second control member is operatively connected to a diaphragm, which interacts with the vacuum in the intake tract, wherein a force counter to the preloading force of the second spring element can be produced by means of a vacuum acting on the diaphragm. The diaphragm can have an outer side, which can be subjected to ambient air, wherein the outer side lies opposite the side of the diaphragm which delimits a space subject to the vacuum in the intake tract.

The main body, the first control member, the second control member and/or the separating body can be of hollow-cylindrical design, can be fitted into one another and can extend around a common center line. The first control member can be guided along the center line against the inner wall of the main body, and the second control member can be guided along the center line on the outer circumferential surface of the main body. Thus, the two control members can be guided against the main body without the guidance of the first control member being affected by the guidance of the second control member.

Finally, a housing, preferably of hollow-cylindrical design, can be provided, in which the main body, the first control member, the second control member and/or the separating body are accommodated, wherein, in particular, the diaphragm is arranged sealingly on an end side of the housing. This results in a compact oil separation device of small overall size and of approximately cylindrical or cup-shaped design, which can receive a flow axially from the inside, and the gas stream can flow around the central inflow region in the form of a jacketing flow and can be passed out of the oil separation device again in the form of a ring. As a result, the outflow side can surround the inflow side in the form of a jacket.

Each of the FIGS. 1 to 4c shows an embodiment of an oil separation device 1, wherein the oil separation device 1 is in various operating states, which correspond to various operating points of the combustion engine. The construction of the oil separation device 1 according to the illustration in FIGS. 1 to 4c is therefore first of all described independently of the operating state.

The oil separation device 1 is used to separate oil from a gas stream 10 for ventilating a crankcase of a combustion engine. For this purpose, the oil separation device 1 has an inflow side 11, which can be connected fluidically to the crankcase of the combustion engine. The oil separation device 1 furthermore has an outflow side 12, which can be connected to an intake tract of the combustion engine.

The oil separation device 1 has a housing 25, which is of approximately hollow-cylindrical design and extends around a center line 24. Arranged in the housing 25 is a separating body 17, which is of tubular design and likewise extends around the center line 24, concentrically with the inner wall of the housing 25. The separating body 17 can be formed from a nonwoven material, for example, and has a diameter such that it is accommodated in the housing 25 with only a small spacing with respect to the inner wall of said housing.

Figure 2:
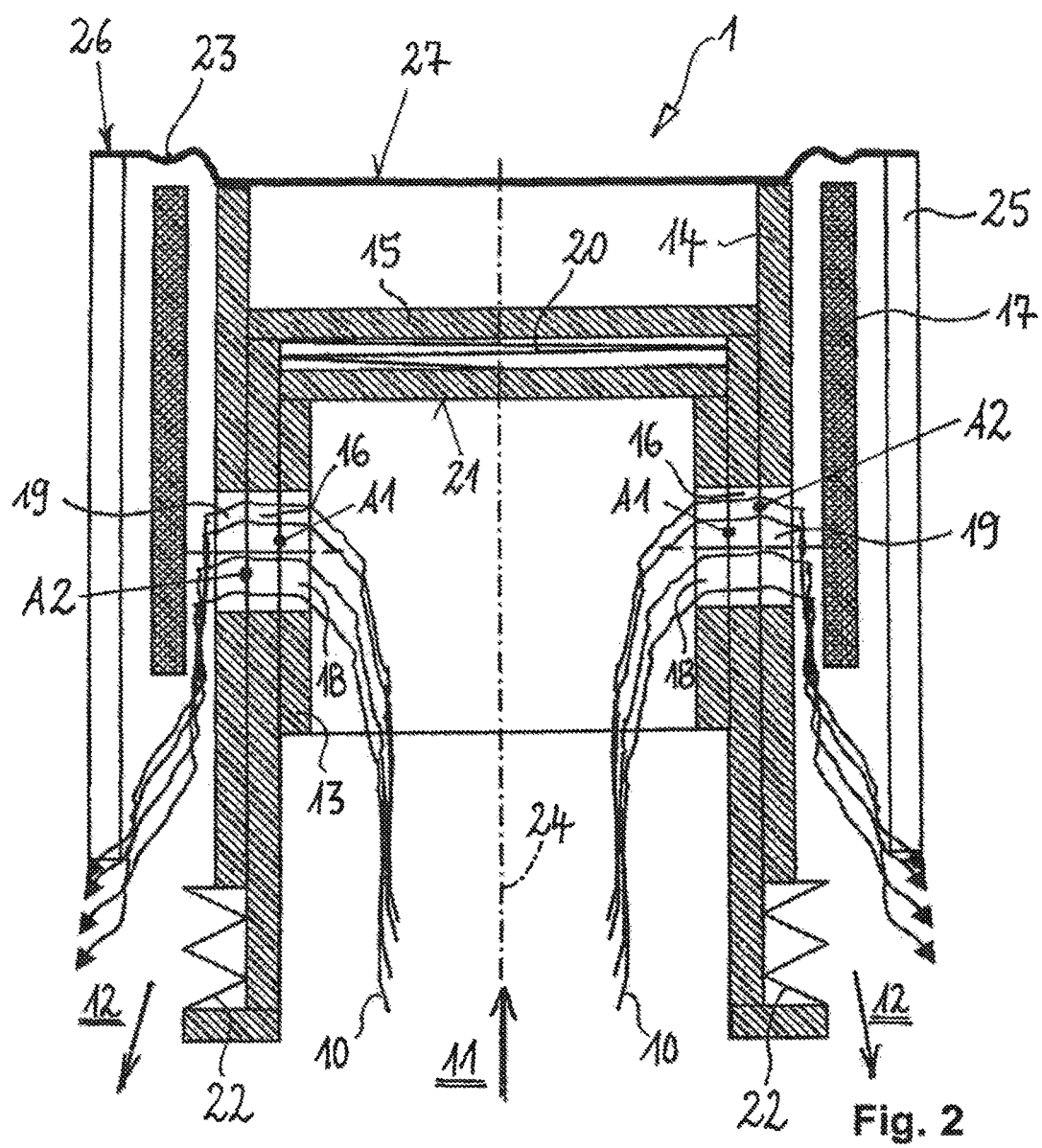
FIG. 2 is a cross-sectional view of an example oil separation device for separating oil from a gas stream for ventilating a crankcase of a combustion engine, wherein the combustion engine is in an operating state with a high torque and a low speed.
Figure 3:
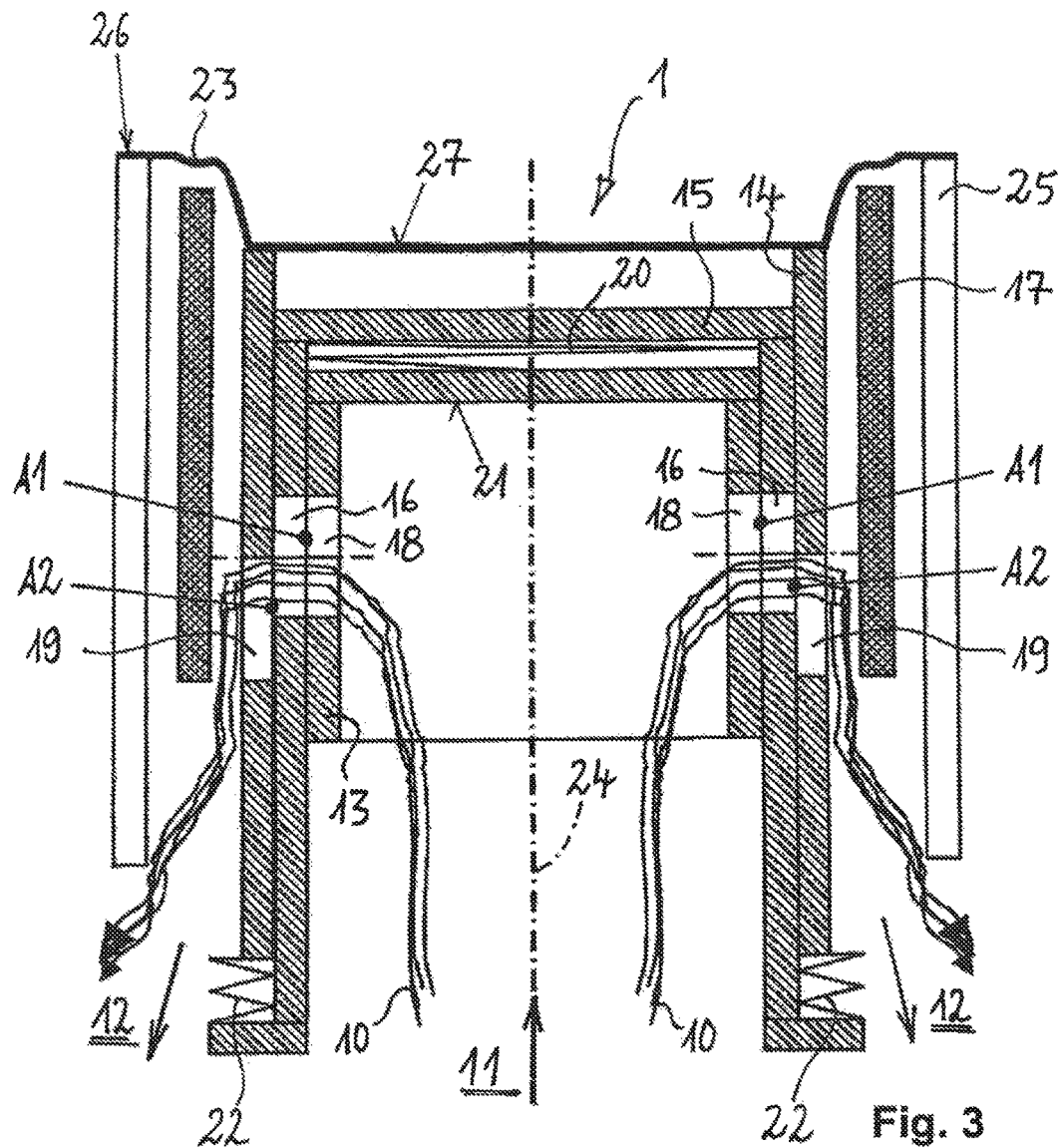
FIG. 3 is a cross-sectional view of an example oil separation device for separating oil from a gas stream for ventilating a crankcase of a combustion engine, wherein the combustion engine is in an operating state with a high torque and a high speed.

As shown in FIGS. 1, 2 and 3, there is a main body 15 on the inside of the separating body 17, wherein the inflow side 11 of the oil separation device 1 is formed within the main body 15 and the outflow side 12 of the oil separation device 1 is formed outside the main body 15, in the radially encircling gap between the main body 15 and the inside of the housing 25.

A plurality of flow openings 16, through which the gas stream 10 can flow from the inside of the main body 15 to the outside of the main body 15, are introduced into the circumference of the main body 15 in a manner distributed around the center line 24, said main body 15 having a base and thus being of cup-shaped design. In this case, the separating body 17 surrounds the main body 15 at least at the level of the flow openings 16 introduced into the main body 15, with the result that the oil-laden gas stream 10 flows out of the crankcase of the combustion engine from the inside to the outside through the flow openings 16 in the main body 15 and thus impinges upon the inside of the separating body 17. By virtue of the flow against the inside of the separating body 17, the oil droplets entrained with the gas stream 10 or the entrained oil mist can be separated out at the separating body 17. When the oil stream 10 strikes the inside of the separating body 17, the gas stream 10 is, in particular, deflected in order to reach the outflow side 12. During this deflection, the heavy oil droplets strike the inside of the separating body 17 and adhere to the latter.

Accommodated within the main body 15 is a first control member 13, which is likewise of cup-shaped design, and the first control member 13 is guided in such a way that it can slide along the center line 24 over the inside of the main body 15. In the first control member 13, corresponding to the flow openings 16 in the main body 15, there is likewise a plurality of control openings 18 and, depending on the position of the first control member 13, the overlap between the control openings 18 and the flow openings 16 can be varied, thereby forming a variable first flow cross section A1 in the flow path of the gas stream 10.

By means of the accommodation of the first control member 13 within the main body 15, the closed first control member 13 of cup-shaped design is subjected to the gas pressure prevailing in the crankcase of the combustion engine. The pressurization of the first control member 13 is accomplished by arranging the first control member 13 on the inflow side 11, with the result that the gas stream 10 flows into the cup-shaped first control member 13. On the outside of the first control member 13, between the cup base of the main body 15 and the cup base of the first control member 13, there is a first spring element 20, by means of which the first control member 13 is preloaded, wherein the cup base of the first control member 13 forms an effective surface 21, which can be subjected to the gas pressure in the crankcase, and wherein a force counter to the preloading force of the first spring element 20 can be produced by means of the gas pressure on the effective surface 21.

If the gas pressure against the effective surface 21 rises, the first spring element 20 is compressed and the first control member 13 moves deeper into the cup-shaped main body 15 along the center line 24, as a result of which the first flow cross section A1 between the flow openings 16 and the control openings 18 is enlarged. If the gas pressure in the crankcase falls again, the first spring element 20 relaxes and the first control member 13 is guided back out of the cup-shaped main body 15 along the center line 24, as a result of which the first flow cross section A1 becomes smaller again.

A second control member 14 is mounted on the outer circumferential surface of the main body 15, and the second control member 14 is also guided in such a way that it can perform a stroke motion in the direction of the center line 24 on the outside of the main body 15. The second control member 14 is preloaded by a second spring element 22, and a diaphragm 23 is provided, which movably closes a radially encircling gap between the housing 25 and the second control member 14 inasmuch as the outer part of the diaphragm 23 ends with an encircling end side 26 of the housing 25. By means of the diaphragm 23, the radial gap between the second control member 14 and the inside of the housing 25 is closed at one end, with the result that the outflow side 12 formed by the encircling, radially extending space between the housing 25 and the second control member 14 is fluidically in contact. If the vacuum in the intake tract of the combustion engine increases in accordance with the speed of the combustion engine, the second control member 14 moves further up the main body 15. If the vacuum in the intake tract of the combustion engine decreases again, the second spring element 22 guides the second control member 14 back again. The return of the second control member 14 takes place against an ambient pressure acting on an outer side 27 of the diaphragm 23.

In the second control member 14, there are control openings 19, which correspond to the flow openings 16 in the main body 15. Depending on the stroke position of the second control member 14 along the center line 24, the overlap between the control openings 19 and the flow openings 16 can be varied, thereby forming a second variable flow cross section A2. Thus, along the flow path of the gas stream 10, the first flow cross section A1 is followed by the second flow cross section A2, each of said cross sections being variable independently of one another, thus making it possible to influence the gas flow against the inside of the separating body 17 in accordance with the gas pressure in the crankcase of the combustion engine, on the one hand, and in accordance with the vacuum in the intake tract of the combustion engine, on the other hand.

FIG. 1 shows the oil separation device 1 in a first operating state in the case of a low volume flow of blow-by gases formed in the crankcase of the combustion engine. In this case, the combustion engine simultaneously has a low speed. Owing to the smaller volume of blow-by gases formed in the crankcase, the gas pressure in the crankcase is relatively low, and therefore the resulting force exerted by the gas pressure on the effective surface 21 of the first control member 13 is low and the first spring element 20 guides the first control member 13 out of the main body 15 toward the inflow side 11. As a result, the first flow cross section A1 decreases. The consequence is that, at a relatively low volume flow of the gas stream 10 due to a smaller volume of blow-by gas formed, a sufficiently high speed of the gas stream 10 through the openings 18, 16, 19 is nevertheless produced, thus allowing effective oil separation on the inside of the separating body 17.

FIG. 2 shows an operating state of the oil separation device 1 corresponding to an operating point of the combustion engine which is being operated at a high power but at a low speed. Owing to the high power brought about by a high torque of the combustion engine, a larger volume of blow-by gases is formed, with the result that the higher gas pressure in the crankcase pushes the first control member 13 into the main body 15 through the pressurization of the effective surface 21 while simultaneously compressing the first spring element 20. As a result, the overlap between the control openings 18 and the flow openings 16 increases and therefore a larger first flow cross section A1 is formed. Owing to the speed of the combustion engine, which is still low however, the vacuum on the outflow side 12 fluidically connected to the intake tract of the combustion engine is still relatively low, with the result that the second control member 14 is not drawn further onto the main body 15 while simultaneously compressing the second spring element 22. Consequently, the flow opening 16 and the control opening 19 remain substantially in overlap, with the result that a maximum flow cross section through the openings 16, 18 and 19 is obtained. Owing to the higher volume flow in the gas stream 10 due to the larger volume of blow-by gas formed, oil separation at the separating body 17 can develop its full effect, but there is no need to limit the vacuum in the crankcase owing to the low vacuum on the intake side of the combustion engine, and therefore the full cross section which can be provided by the openings 16, 18 and 19 can be formed.

Finally, FIG. 3 shows another operating state of the oil separation device 1 in accordance with an operating point of the combustion engine which is distinguished by a high torque and hence a large volume of blow-by gas formed, combined with a high speed. Here, the high speed causes a powerful vacuum in the intake tract, with the result that the second control member 14 is drawn further up the main body 15 and with the result that the second flow cross section A2 is reduced by the only partial overlap of the flow opening 16 with the control opening 19. This gives rise to a throttling effect, as a result of which the vacuum in the crankcase is not intensified by the powerful vacuum in the intake tract while, at the same time, there is a desired rise in flow resistance in order to bring about a nozzle effect of the gas stream 10 against the inside of the separating body 17.

FIGS. 4a to 4c each show a cross-sectional view of an embodiment of an oil separation device 1 in which two separating bodies 17 and 17.1 are arranged instead of a single separating body 17. As already indicated above, it is advantageous if the first separating body 17 is a nonwoven or, in particular, comprises a nonwoven material, which is used to separate a liquid medium, e.g. oil, from the volume flow 10 or gas stream 10. The first separating body 17 extends in a circumferential direction around the main body 15, in particular in a region of the second flow cross section A2, and separates the inflow side 11 from the outflow side 12 of the oil separation device 1. It is advantageous if the second flow cross section A2 extends between the main body 15 and the pressure control valve segment 30, which has a pressure control valve diaphragm 31 for controlling the pressure in the engine compartment. A second separating body 17.1 is arranged in the region of the first control member 13, in particular in the region of a first flow cross section A1, and is comparable with the first separating body 17, likewise advantageously being a nonwoven or advantageously comprising a nonwoven material. It is advantageous if it circumferentially surrounds the first control member 13, which is a small flexible plate for example. The second separating body 17.1 has a smaller diameter than the first separating body 17, especially if both separating bodies 17 and 17.1 are of tubular configuration. In this case, each of the two separating bodies 17, 17.1 has an inner surface or an inside on which a gas stream 10 advantageously impinges during the separating process and is deflected in the direction of the outflow side 12. During this deflection process of the gas stream 10, the oil droplets contained in the gas stream 10 or volume flow 10 adhere to the separating body 17 or 17.1.

A larger or smaller quantity of a gas stream 10 is transported through the oil separation device 1, depending on the power or load of a combustion engine of a motor vehicle in which the oil separation device 1 shown is used. As a consequence, the flow cross sections A1 and A2 also vary in order to enable the volume flow 10 to be made to flow through the oil separation device 1, advantageously without a pressure loss or at least with only a very small pressure loss across the system, that is to say in the region of the crankcase as well as in the region of the intake tract of the combustion engine.

At a low load and/or a low speed of the combustion engine of, for example, 1500 rpm, the gas stream 10 flowing into the oil separation device 1 from the inflow side 11 is accordingly likewise small and has a value of about 25 l/min, for example. During this process, the vacuum ahead of the compressor or turbocharger (not shown here) is about 8 mbar, for example. As shown in FIG. 4a, this state leads to maximum opening of the cross section A2 and to minimum deformation of the control member 13. Consequently, the first flow cross section A1 exposed by the first control member 13 is also small and has a size of 30 mm², for example. The first control member 13 is a flexible element, which adapts to the volume of the gas flow 10 and consequently offers the possibility of exposing a flow cross section A1 of variable size.

Accordingly, a cross-sectional view of the embodiment of an oil separation device shown in FIG. 4a is shown in a second state in FIG. 4b and in a third state in FIG. 4c. As shown in FIG. 4b, the first control member 13 is deformed or bent to an increasing extent, based on an increased gas stream 10 compared with the state shown in FIG. 4a. This increased gas stream 10 or volume flow 10 has a value of about 50 l/min, for example, and occurs, for example, during operation, in particular during a full load operating point of the combustion engine, at a speed of about 2000 rpm. In this state, the vacuum ahead of the compressor is about 10 mbar, for example. The deformation of the first control member 13 is at a maximum, in particular because of the high volume flow 10 and the higher pressure in comparison with the state shown in FIG. 4a, namely owing to the higher pressure on the inflow side 11, with the result that a first flow cross section A1 is formed, with an opening which advantageously has a size of about 50 mm². The second flow cross section A2 is advantageously unchanged and, particularly advantageously, is at a maximum.

As shown in FIGS. 4a and 4b, the gas stream 10 flows through the first flow cross section A1, which is varied by the first control member 13, and impinges on the second separating body 17.1, is deflected by the latter and flows out of the region of the main body 15 in the direction of the pressure control valve diaphragm 31 of the pressure control valve segment 30. The pressure control valve segment 31 exposes a second flow cross section A2, through which the gas stream 10 is passed in the direction of the first separating body 17, on the inside of which the gas stream 10, which has now been at least partially freed from the oil droplets, is deflected in order to flow out of the oil separation device 1 in the direction of the outflow side 12. As shown in FIGS. 4a and 4b, no control by the pressure control valve segment 30 takes place particularly when load points exhibiting a low vacuum occur on the outflow side 12, with the result that the illustrated second flow cross section advantageously remains unchanged.

If the load of the combustion engine, in particular the operating load point and/or the speed, is increased further to about 4000 rpm for example, the gas stream 10 is also increased, e.g. to about 50 l/min, wherein the vacuum ahead of the compressor is about 50 mbar, for example, during this load state. In this case, the pressure control valve segment 30, which advantageously acts as the second control member 14, controls the pressure compensation by moving in the direction of the first control member 13 and consequently reducing the second flow cross section A2. This is shown, in particular, in FIG. 4c.

As a result, an oil separation device 1 with a double acting switching characteristic is created, and the effective separating cross section can be optimized for each operating point of the combustion engine in order to increase separation performance in the oil separation device. In particular, it is possible to prevent the vacuum in the crankcase rising too sharply when there is a powerful vacuum in the intake tract, but at the same time a high separation performance can be achieved despite a low speed when there is a large volume of blow-by gas formed.

The invention is not restricted in its embodiment to the preferred embodiment indicated above. On the contrary, a number of variants is conceivable which make use of the illustrated solution, even where the embodiment is of a fundamentally different type. All the features and/or advantages emerging from the claims, the description or the drawings, including design details or spatial arrangements, can be essential to the invention, either individually or in a very wide range of combinations.

What is claimed is:

1. An oil separation device for separating oil from a gas stream for ventilating a crankcase of a combustion engine, the oil separation device comprising:
   a main body having,
      an inflow side configured as a gas inlet to be connected to, and receive an oil laden gas stream from, the crankcase of the combustion engine, and
      a flow opening defined in said main body downstream of said inflow side;
   a first control member disposed adjacent said flow opening of said main body that, together with said flow opening, forms a variable size first flow cross section through which the oil laden gas stream is permitted to flow from said main body, wherein said first control member is controlled by a gas pressure in the crankcase to vary the size of said first flow cross section;
   a second control member disposed adjacent said flow opening of said main body that, together with said flow opening, forms a variable size second flow cross section downstream of said variable size first flow cross section, through which second flow cross section the oil laden gas stream is permitted to flow, wherein said second control member is controlled by a vacuum in the intake tract of the combustion engine to vary the size of said second flow cross section;
   a housing coupled to and surrounding said main body, said housing configured to permit the oil laden gas stream to flow between said main body and said housing from said second flow cross section, said housing having an outflow side that is a gas outlet configured to be connected to an intake tract of the combustion engine; and
   a separating body disposed between said main body and said housing, downstream of said second flow cross section, and positioned such that the oil laden gas stream flows against said separating body after passing through said second flow cross section, which gas flow against said separating body purges at least a portion of the oil from the oil laden gas stream prior to said gas stream flowing out of said outflow side of said housing to the intake tract of the combustion engine,
   wherein said second control member is positioned opposite said first control member and defines a second control opening,
   wherein said variable size second flow cross section, disposed downstream of said variable size first flow cross section and through which second flow cross section the oil laden gas stream is permitted to flow, is formed by said second control opening in said second control member at least partially overlapping said flow opening in said main body,
   wherein said second control member is moveable with respect to said main body such that movement of said second control member relative to said main body controls an amount of overlap between said second control opening and said flow opening, wherein changing the amount of overlap between said second control opening and said flow opening changes the size of the second flow cross section.

2. The oil separation device of claim 1,
wherein said first control member defines a first control opening,
wherein said variable size first flow cross section, through which the oil laden gas stream is permitted to flow from said main body, is formed by said first control opening in said first control member at least partially overlapping said flow opening in said main body,
wherein said first control member is moveable with respect to said main body such that movement of said first control member relative to said main body controls an amount of overlap between said first control opening and said flow opening, wherein changing the amount of overlap between said first control opening and said flow opening changes the size of said first flow cross section.

3. The oil separation device of claim 1, further comprising:
a spring element that preloads said first control member, wherein a gas pressure in the crankcase that is exerted against an effective surface of said first control member opposes a preloading force exerted on said first control member by said spring element.

4. The oil separation device of claim 1 further comprising:
a spring element that preloads the second control member; and
a diaphragm to which the second control member is operatively connected, wherein the diaphragm interacts with the vacuum in the intake tract of the combustion engine, wherein a force generated by the vacuum opposes a preloading force exerted on the second control member by the spring element.

5. The oil separation device of claim 1 further comprising:
a first spring element that preloads the first control member, wherein a gas pressure in the crankcase that is exerted against an effective surface of the first control member opposes a preloading force exerted on the first control member by the first spring element;
a second spring element that preloads the second control member; and
a diaphragm to which the second control member is operatively connected, wherein the diaphragm interacts with the vacuum in the intake tract of the combustion engine, wherein a force generated by the vacuum opposes a preloading force exerted on the second control member by the second spring element.

6. The oil separation device of claim 1,
wherein said main body, said first control member, said second control member, and said separating body have a hollow-cylindrical form, are nested into one another, and are positioned about a common center line.

7. The oil separation device of claim 6, wherein said housing has a hollow-cylindrical form for accommodating at least one of the main body, the first control member, the second control member, or the separating body, said oil separation device further comprising:
a diaphragm operatively connected to said second control member, wherein said diaphragm seals an end side of said housing.

8. The oil separation device of claim 1,
wherein said main body and said first and second control members are positioned about a center line, and
wherein at least one of
said first control member is guided along said center line against an inner wall of said main body, or
said second control member is guided along said center line along an outer circumferential surface of said main body.

9. The oil separation device of claim 1 further comprising:
a spring element that preloads the second control member; and
a diaphragm to which the second control member is operatively connected, wherein the diaphragm interacts with the vacuum in the intake tract of the combustion engine, wherein a force generated by the vacuum opposes a preloading force exerted on the second control member by the spring element,
wherein an outer side of the diaphragm is subjected to ambient air pressure, wherein the outer side of the diaphragm lies opposite a side of the diaphragm that is operatively connectable to the vacuum in the intake tract of the combustion engine.

10. An oil separation device for separating oil from a gas stream for ventilating a crankcase of a combustion engine, the oil separation device comprising:
a main body that comprises:
an inflow side that receives the gas stream laden with liquid, wherein the inflow side is configured to be connected to the crankcase of the combustion engine;
an outflow side into which the gas stream substantially purged of the liquid flows, wherein the outflow side is configured to be connected to an intake tract of the combustion engine;
a control member for varying a first flow cross section of the gas stream in the inflow side of the main body;
a pressure control valve segment for controlling pressure in an engine compartment by varying a second flow cross section of the gas stream positioned downstream of the first flow cross section, wherein the second flow cross section extends between the pressure control valve segment and the main body;
a first separating body for separating the liquid from the gas stream, the first separating body extending in a circumferential direction around the main body and separating the inflow side from the outflow side in a region of the second flow cross section; and
a second separating body for separating the liquid from the gas stream, the second separating body disposed in a region of the first flow cross section.

11. The oil separation device of claim 10 wherein the pressure control valve comprises a pressure control valve diaphragm.

12. The oil separation device of claim 10 wherein the second separating body circumferentially surrounds the control member.

13. The oil separation device of claim 10 wherein the control member is a flexible element that adapts to a volume flow of the gas stream.

14. An oil separation device for separating oil from a gas stream for ventilating a crankcase of a combustion engine, the oil separation device comprising:
a main body having,
an inflow side configured as a gas inlet to be connected to, and receive an oil laden gas stream from, the crankcase of the combustion engine, and
a flow opening defined in said main body downstream of said inflow side;
a first control member disposed adjacent said main body and defining a first control opening at least partially overlapping said flow opening in said main body, said first control member being moveable with respect to said main body such that movement of said first control member relative to said main body controls an amount of overlap between said first control opening and said flow opening, so as to form a variable size first flow cross section through which the oil laden gas stream is permitted to flow from said main body, wherein movement of said first control member is controlled by a gas pressure in the crankcase;

a second control member disposed adjacent said main body opposite said first control member and defining a second control opening at least partially overlapping said flow opening in said main body, said second control member being moveable with respect to said main body such that movement of said second control member relative to said main body controls an amount of overlap between said second control opening and said flow opening, so as to form a variable size second flow cross section downstream of said variable size first flow cross section, through which second flow cross section the oil laden gas stream is permitted to flow, wherein movement of said second control member is controlled by a vacuum in the intake tract of the combustion engine;

a housing coupled to and surrounding said main body, said housing configured to permit the oil laden gas stream to flow between said main body and said housing from said second flow cross section, said housing having an outflow side that is a gas outlet configured to be connected to an intake tract of the combustion engine; and a separating body disposed between said main body and said housing, downstream of said second flow cross section, and positioned such that the oil laden gas stream flows against said separating body after passing through said second flow cross section, which gas flow against said separating body purges at least a portion of the oil from the oil laden gas stream prior to said gas stream flowing out of said outflow side of said housing to the intake tract of the combustion engine.

15. An oil separation device for separating oil from a gas stream for ventilating a crankcase of a combustion engine, the oil separation device comprising:

a main body having, an inflow side configured as a gas inlet to be connected to, and receive an oil laden gas stream from, the crankcase of the combustion engine, and a flow opening defined in said main body downstream of said inflow side;

a first control member disposed adjacent said flow opening of said main body that, together with said flow opening, forms a variable size first flow cross section through which the oil laden gas stream is permitted to flow from said main body, wherein said first control member is controlled by a gas pressure in the crankcase to vary the size of said first flow cross section;

a second control member disposed adjacent said flow opening of said main body that, together with said flow opening, forms a variable size second flow cross section downstream of said variable size first flow cross section, through which second flow cross section the oil laden gas stream is permitted to flow, wherein said second control member is controlled by a vacuum in the intake tract of the combustion engine to vary the size of said second flow cross section;

a housing coupled to and surrounding said main body, said housing configured to permit the oil laden gas stream to flow between said main body and said housing from said second flow cross section, said housing having an outflow side that is a gas outlet configured to be connected to an intake tract of the combustion engine; and a separating body disposed between said main body and said housing, downstream of said second flow cross section, and positioned such that the oil laden gas stream flows against said separating body after passing through said second flow cross section, which gas flow against said separating body purges at least a portion of the oil from the oil laden gas stream prior to said gas stream flowing out of said outflow side of said housing to the intake tract of the combustion engine, wherein said main body, said first control member, said second control member, and said separating body have a hollow-cylindrical form, are nested into one another, and are positioned about a common center line.

* * * * *